Patented Nov. 10, 1953

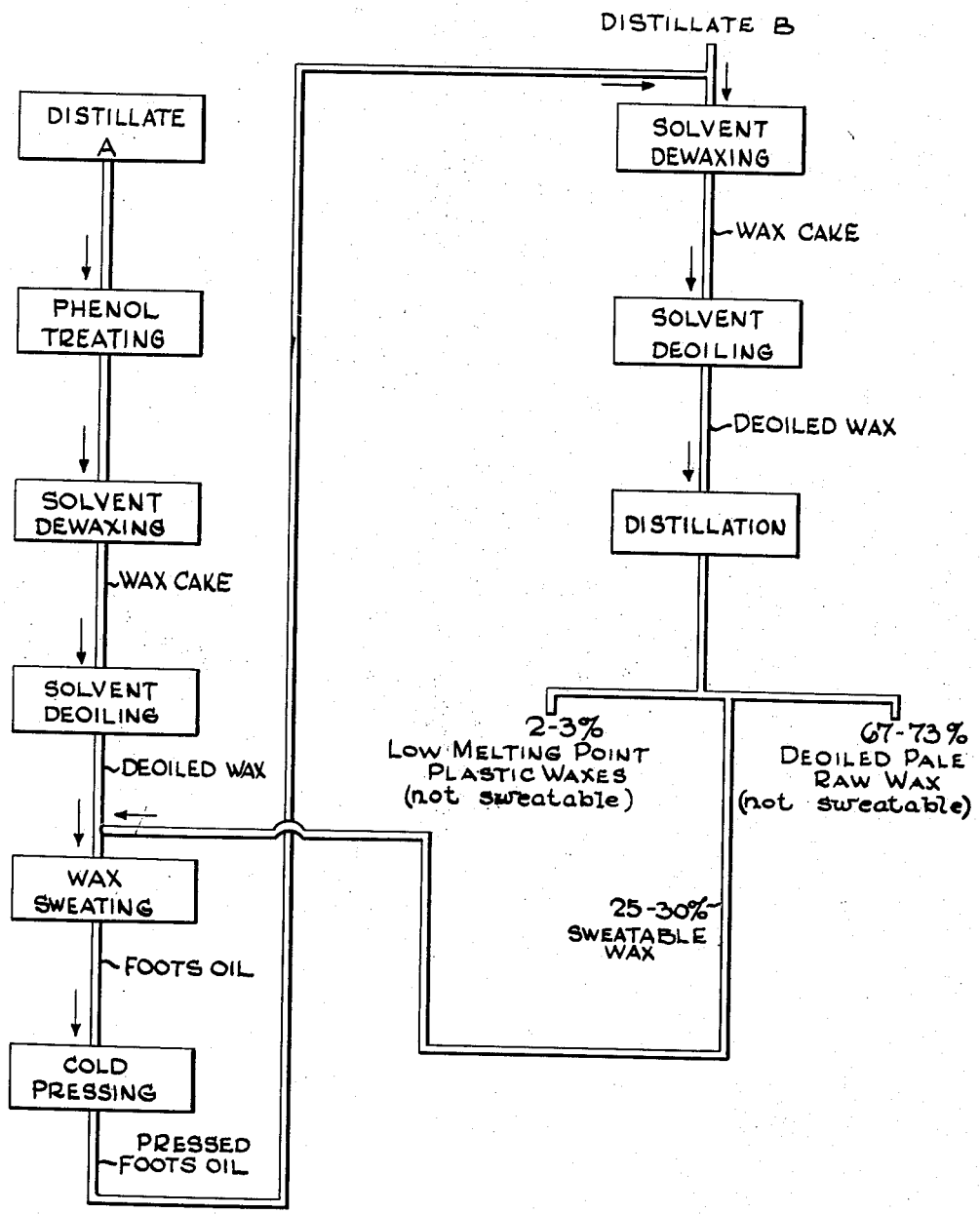

2,658,852

UNITED STATES PATENT OFFICE 2,658,852

METHOD OF MANUFACTURING LOW MELTING POINT PLASTIC WAXES

John L. Tiedje and John Basil McGrath, Sarnia, Lambton, Ontario, Canada, assignors to Standard Oil Development Company, a corporation of Delaware Application July 20, 1950, Serial No. 174,938

11 Claims. (Cl. 196—17)

1

This invention relates to the manufacture of low melting point plastic waxes.

Waxes occur in a wide range of forms in petroleum oils. They may be classified starting with bodies liquid at ordinary temperatures but freezing readily ("liquid waxes") in a continuous series having increasing melting points, boiling points and molecular weights. In general, the higher the molecular weights, the smaller is the crystal size of those forms which will crystallize. At one extreme are the crystalline waxes of low melting point, not over about 132° F., shading into the liquid waxes. Waxy oils in which the wax content is largely of this crystalline type may be readily freed of wax by chilling and filter pressing. These waxes crystallize easily, in a filterable form. Waxy oils of this type are called pressable oils, for this reason. On the other hand, oils containing any substantial proportion of crystalline wax do not yield to centrifugal separation. Upon diluting such an oil with naphtha, chilling and subjecting to centrifugal force, a wax gel is produced in the chilled mixture of waxy oil and naphtha. This happens even when the crystalline wax content of the oil is small. This gel formation makes centrifugal separation impracticable since satisfactory centrifugal removal depends upon throwing out of individual solid particles of wax. While it is possible theoretically to modify oils containing large quantities of crystalline wax to permit centrifugal separation, by adding amorphous wax to modify the crystalline wax, the amount of amorphous wax required is so huge as to rule out the procedure for most practical purposes. It has been found that low pour test oils cannot be produced commercially by such procedures.

Crude crystalline waxes after removal from the oil can be refined and purified by the well known sweating process to secure familiar translucent white wax products of low melting point and crystalline structure. Accordingly such waxes are often referred to as sweatable waxes.

Soft, low-melting plastic waxes are found in considerable quantities in foots oil obtained as a by-product of wax sweating. These low melting plastic waxes cannot be recovered by sweating or centrifuging nor can they be satisfactorily cold pressed to a low oil content. Furthermore, it is generally not practical to segregate the foots oil for processing in refinery solvent dewaxing equipment due to the relatively small volume of foots oil available.

It has now been found that the low melting plastic waxes can be recovered with a sufficiently low oil content as to be marketable with no further processing by blending cold pressed foots oil with a higher boiling lubricating oil distillate than that from which the foots oil was made, solvent dewaxing the blend, deoiling the wax cake and vacuum distilling the wax cake to recover the plastic waxes as well as a valuable lubricating oil distillate. If about 5% of pressed foots oil is blended with the heavier distillate and the second dewaxing is carried out at a higher temperature, a considerable improvement in V. I. of the dewaxed oil will result.

For convenience of description the present invention is illustrated by the accompanying drawing which represents a flow sheet of an actual full scale operation within the scope of the invention wherein a lubricating oil distillate is treated by successive operations with the ultimate production of merchantable low melting point plastic waxes, the several process steps being indicated by appropriate legends.

Referring to the flow chart, a waxy paraffin Mid-Continent lubricating oil distillate having a viscosity at 100° F. of between 155 and 165 Saybolt seconds and a boiling range of 650 to 830° F. at atmospheric pressure (distillate A shown at the upper left-hand side of the figure) is phenol treated with a 70% yield to a 93 V. I. The phenol treated distillate is solvent dewaxed to a 0° F. solid point (from 80° F. solid) and the wax cake solvent deoiled in one state to approximately 7 to 10% oil with a 19% yield on charge. On sweating this wax a 30% yield of foots oil is obtained. Cold pressing at 80° F. removes crystalline paraffin waxes which are recycled to the wax sweaters (20 to 30% of foots oil charge). The pressed foots oil is then blended in a 5% concentration with a phenol treated waxy Mid-Continent lubricating oil distillate boiling in the range from 800 to 980° F. at atmospheric pressure and having a viscosity at 210° F. between 77 and 82 Saybolt seconds (distillate B shown at upper right-hand side of the figure). This blend is then solvent dewaxed to a 28° F. solid point and the resulting wax cake deoiled in two stages to between 3 and 7% oil. The dewaxed blended oil was found to have a V. I. of 93 as against 90 when dewaxing the unblended distillate. The deoiled wax cake is rerun under vacuum to recover 2 to 3% of a very soft plastic wax having an A. S. T. M. melting point of 104° F. and an oil content of 2.9%. In spite of its comparatively high oil content this wax shows no tendency to blend oil.

The nature and objects of the present invention having been thus described and illustrated, what is claimed as new and useful and is desired to be secured by Letters Patent is:

1. The process of preparing low melting point plastic waxes from foots oil derived from a light, waxy, lubricating oil distillate which comprises pressing the foots oil at about 80° F., blending the pressed foots oil with a heavy waxy lubricating oil distillate of higher boiling point than said light waxy lubricating oil distillate, dewaxing the resulting blend, deoiling the wax cake obtained from said dewaxing, and fractionating the deoiled wax cake to obtain said low melting point plastic waxes.

2. Process as described in claim 1 in which the light waxy lubricating oil distillate boils in the range of about 650° F. to 830° F., and the heavy waxy lubricating oil distillate boils in the range of about 800 to 980° F.

3. The process of preparing low melting point plastic waxes and high V. I. low cold test lubricating oil distillates which comprises pressing at about 80° F. a foots oil derived from a light waxy lubricating oil distillate, blending the pressed foots oil with a heavy waxy lubricating oil distillate of higher boiling point than said light waxy lubricating oil distillate, dewaxing the resulting blend to produce a dewaxed heavy lubricating oil distillate and a second wax cake, deoiling said second wax cake, and fractionating the deoiled wax cake to obtain said low melting point waxes.

4. Process as described in claim 3 in which the light waxy lubricating oil distillate boils in the range of 650 to 830° F. and the heavy waxy lubricating oil distillate boils in the range of about 800 to 980° F.

5. Process as described in claim 3 in which the heavy waxy lubricating oil distillate is a solvent extracted stock.

6. The process of preparing low melting point plastic waxes and high V. I. low cold test lubricating oil distillates which comprises dewaxing a light waxy lubricating oil distillate, sweating the resulting wax cake, pressing the resulting foots oil at about 80° F., blending the pressed foots oil with a heavy waxy lubricating oil distillate of higher boiling point than the light waxy lubricating oil distillate, dewaxing the resulting blend to produce a dewaxed heavy lubricating oil distillate and a second wax cake, deoiling said second wax cake and fractionating the deoiled wax cake to obtain said low melting point plastic waxes.

7. Process as described in claim 6 in which about 5 parts of the pressed foots oil is blended with about 95 parts of the heavy waxy lubricating oil distillate.

8. Process as described in claim 6 in which the blend of pressed foots oil and heavy waxy lubricating oil distillate is dewaxed at a higher temperature than is the light waxy lubricating oil distillate.

9. The process of preparing low melting point plastic waxes and high V. I. low cold test lubricating oil distillates which comprises solvent dewaxing a light waxy lubricating oil distillate, sweating the resulting wax cake, pressing the resulting foots oil at about 80° F., blending the pressed foots oil with a solvent extracted heavy waxy lubricating oil distillate of higher boiling point than the light waxy lubricating oil distillate in the ratio of about 5 parts of pressed foots oil to 95 parts of the heavy waxy lubricating oil distillate, solvent dewaxing the resulting blend at a higher temperature than the light waxy lubricating oil distillate was dewaxed, to produce a dewaxed heavy lubricating oil distillate and a second wax cake, solvent deoiling said second wax cake and vacuum distilling the deoiled wax cake to produce said low melting point plastic waxes.

10. Process as described in claim 9 in which the light waxy lubricating oil distillate boils in the range of about 650° F. to 830° F. and the solvent extracted heavy waxy lubricating oil distillate boils in the range of about 800 to 980° F.

11. Process as described in claim 10 in which the light waxy lubricating oil distillate is solvent dewaxed at about 0° F. and the blend of solvent extracted heavy waxy lubricating oil distillate and pressed foots oil is solvent dewaxed at about 30° F.

JOHN L. TIEDJE.
J. BASIL McGRATH.

References Cited in the file of this patent

UNITED STATES PATENTS

| Number | Name | Date |
|---|---|---|
| 1,760,096 | Ward | May 27, 1930 |
| 1,927,057 | Anderson | Sept. 19, 1933 |
| 1,937,518 | Henderson et al. | Dec. 5, 1933 |

OTHER REFERENCES

Bureau of Mines Bulletin, No. 368, "Manufacture of Paraffin Wax from Petroleum," pages 84, 95, and 96, pub. 1935.

Kalichevsky, "Modern Methods of Refining Lubricating Oils," A. C. S. Monograph No. 76, pages 73, 74, 75, and 76 (1938). Published by Reinhold Publishing Co., New York, N. Y.